Jan. 14, 1941.   T. E. DARNELL   2,228,870
NET WEIGHT INDICATOR FOR SCALES
Filed Oct. 21, 1938   2 Sheets-Sheet 2
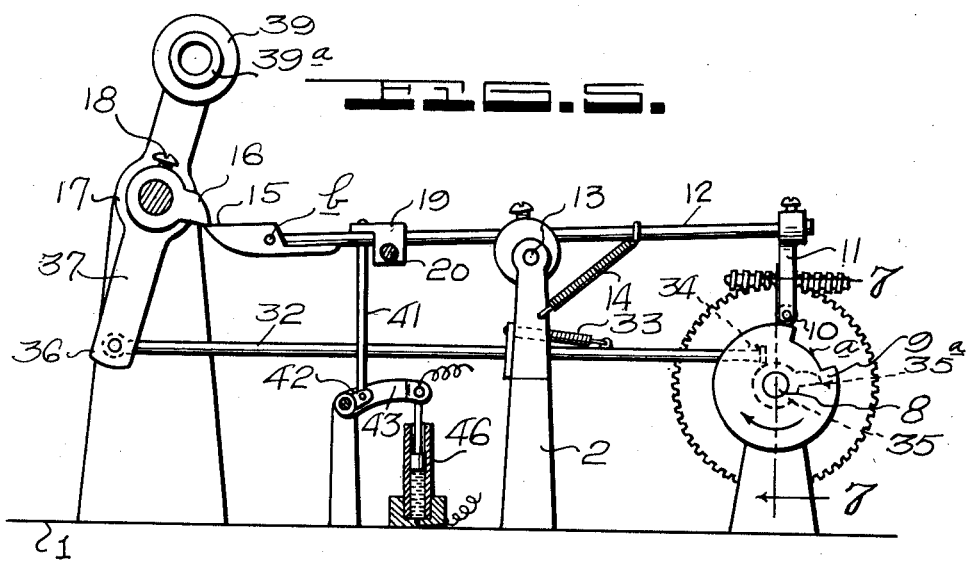
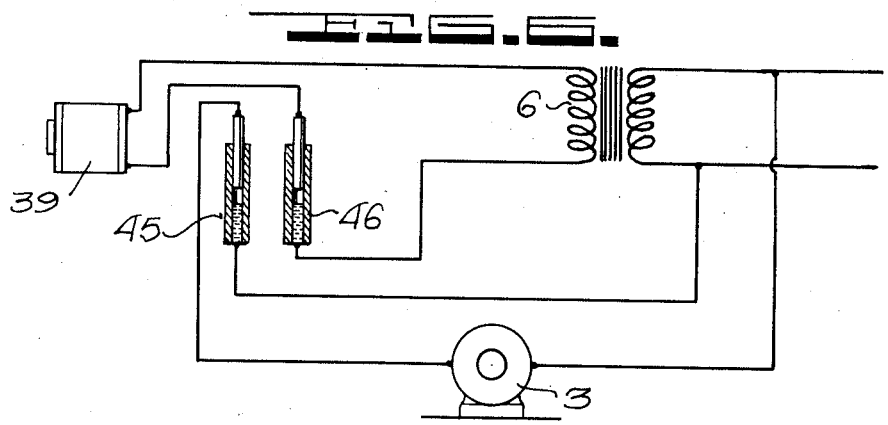
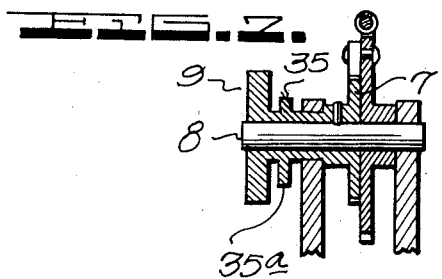
Thomas E. Darnell
INVENTOR.
BY
ATTORNEY.

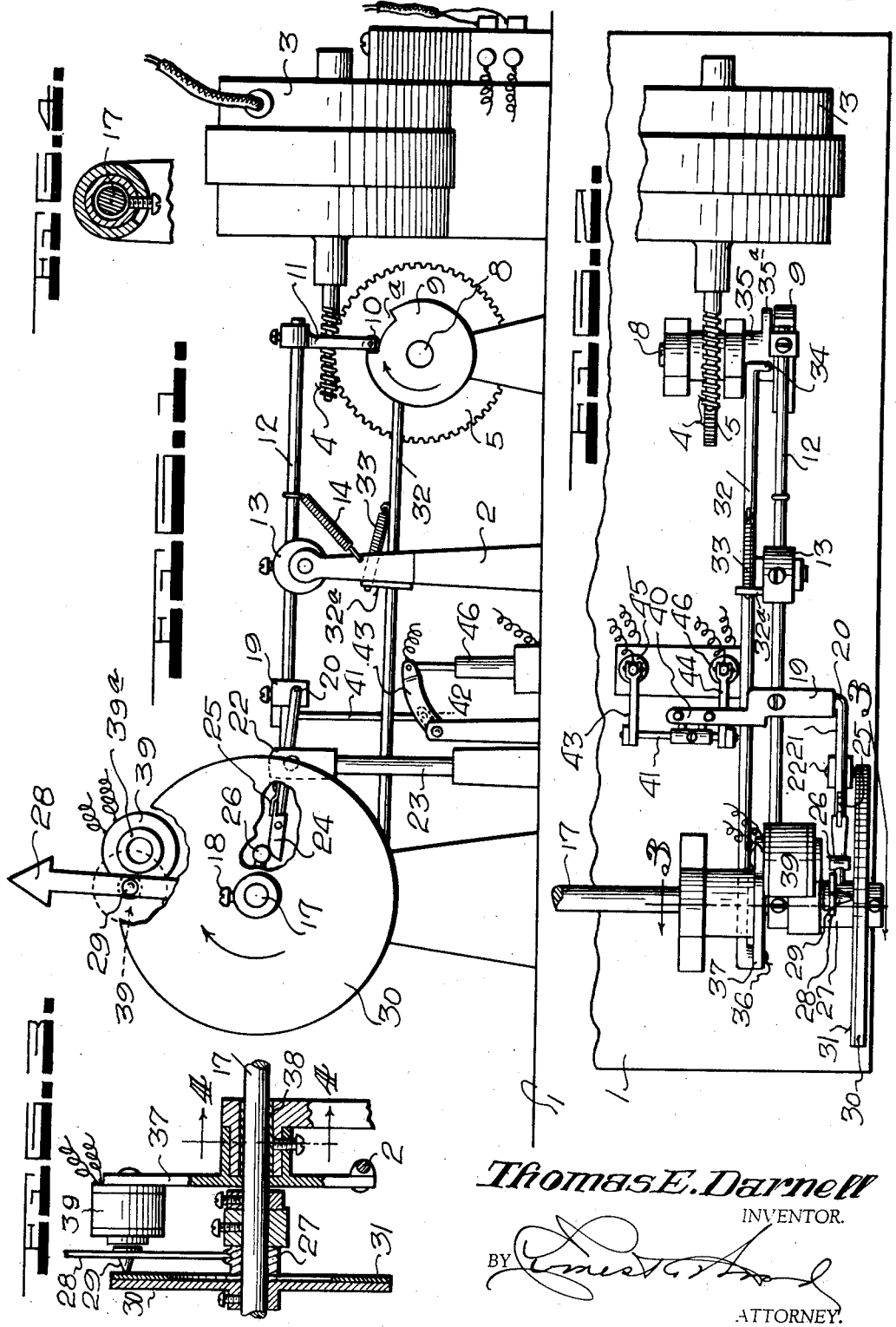

Patented Jan. 14, 1941

2,228,870

UNITED STATES PATENT OFFICE 2,228,870

NET WEIGHT INDICATOR FOR SCALES

Thomas E. Darnell, Midlothian, Tex.

Application October 21, 1938, Serial No. 236,183

1 Claim. (Cl. 265—28)

This invention relates to net weight indicators and it has particular reference to weighing scales which are electrically and mechanically operated.

The principal object of the invention is to provide a mechanism whereby an entire weight of a tare is compensated.

Another object of the invention is to provide a mechanism whereby merchandise containers when placed on a scale, net weight indicators will remain at zero position and will be moved only when merchandise is being placed into the container.

Still another object of the invention is to provide a mechanism whereby the net weight of the contents, either liquid or solid, dispensed within a container may be rapidly determined during the filling operation.

Yet another object of the invention is to provide an indicator adaptable to conventional weighing equipment whereby time will be saved in packaging or bottling of merchandise due to the elimination of hand operations preliminary to the packaging operation.

Still another object of the invention is to provide a net weight indicator capable of adaptation to a wide variety of conventional scales, and which is accurate in its indicies and inexpensive in cost of manufacture.

With the foregoing objects as paramount, the invention has particular reference to its salient features of construction and arrangement of parts which will become manifest as the description proceeds, taken in connection with the accompanying drawings, wherein:

Figure 1 is an elevational view of the invention shown with portions broken away.

Figure 2 is a fragmentary plan view.

Figure 3 is a view taken on the line 3—3 on Figure 2.

Figure 4 is a fragmentary view taken on the line 4—4 on Figure 3.

Figure 5 is an elevational view shown partly in cross section and illustrating one of the electrical contacts.

Figure 6 is a diagrammatic view of the wiring arrangement, and illustrating schematically one of the means by which circuits may be completed and broken.

Figure 7 is a view taken on the line 7—7 on Figure 5.

Heretofore in the packaging of merchandise, either liquid or solid, the tare weight of the container has been manually balanced and the merchandise subsequently dispensed therein. Time loss has heretofore resulted as well as loss due to the personal equation entering into the dispensing operation. The present invention provides a mechanically operated structure which will eliminate the economic losses which have heretofore resulted.

Referring primarily to Figure 1, the reference numeral 1 denoted the scale base for the net weight indicator. A standard 2 is positioned upon the base 1 as illustrated best in Figures 1 and 5.

It will be understood that in order to accomplish operations to be hereinafter described, a source of power such as an electric motor 3 is necessary. The source of power 3 delivers torque to a worm gear 4 which gear is arranged to enmesh a worm wheel 5. The wiring system is best illustrated in Figure 6. Since conventional current of approximately 110 volts is normally supplied by power lines, it is necessary to reduce this voltage by means of a step-down transformer 6, thereby reducing hazards and enabling the mercury or other switches to operate under optimum conditions.

A ratchet or a mechanical equivalent 7, best illustrated in Figure 7 serves to reduce the rate of revolutions of the mechanism under decelerated conditions. It will be understood that a magnetically operated brake may be employed as a mechanical equivalent without departing from the spirit of the invention.

A shaft 8 mounted upon suitable bearings is arranged as shown in Figures 1, 2 and 7. A notched cam 9 is fixedly mounted upon the shaft 8. A cam follower 10, which may be comprised of a roller or any other suitable type of cam follower, is positioned upon a substantially vertical member 11. The member 11 is fixedly mounted upon a shaft 12, which shaft is pivotally connected and eccentrically mounted upon a shaft 13. A spring 14 interconnected between the standard 2 and the member 12 serves to urge the cam follower 10 into a notch $a$ at a predetermined time in the cycle of the operation.

The shaft 12 is provided with a cam contact 15, which contact is hingedly connected thereto. The came contact 15 is hingedly connected to the shaft 12 at $b$. It will be seen that the cam contact 15 is effective in its operation only when in contact with the cam 16 when said cam is operated in a downward direction relative thereto. The cam 16 is fixedly mounted in a predetermined position upon a shaft 17 by means of a set screw 18.

A block 19 is fixedly positioned upon the shaft 12. A pivot point 20 is arranged within the block 19 and is preferably made integral with an arm 21. The arm 21 is pivotally connected at 22 to a standard 23, which standard is fixedly positioned upon the base 1. A cam contact 24, similar in construction to the cam contact 15, but operative in reversed direction, is hingedly connected to the arm 21, and is under the control of a spring 25. The cam contact 24 is arranged to contact a cam 26, which cam is rotatably mounted upon the shaft 17. The cam 26 is affixed to a bearing 27, which bearing serves as a mounting for a net weight hand indicator 28. The hand 28 carries a needle point 29 which point is arranged in frictional contact adjacent the periphery of a disc 30 insulated around its periphery by an insulating ring 31. The hand 28 may be fabricated of spring steel or provided with a leaf spring adjacent its connection with the bearing 27.

A shaft 32 is spring pressed by a spring 33 which spring normally urges the shaft 32 to the left in the elevational views. The shaft 32 is supported by the standard 2 and is provided with a cam contact 34, which cam contact remains at all times in contact with the periphery of a cam 35. The cam 35 is fixedly mounted upon the driven shaft 8 and is provided with a lug 35a.

The end of the shaft 32 opposite to that carrying the cam contact 34 is pivotally connected at 36 to an arm 37, which arm is freely mounted for rotation upon a bushing 38, which bushing is arranged to surround the shaft 17 and is suitably supported by a standard, as shown.

An electro magnet 39 supplied with low voltage current from the transformer 6, is fixedly positioned upon the upper end of the arm 37 and is provided with a non-ferrous ring or collar 39a. This ring serves to insure positioning of a hand directly over the ferrous core. The arm 37 which carries the electro magnet 29 is limited to a predetermined degree of movement by any suitable stops or slotted adjustments, not shown.

The block 19 is preferably formed as best shown in Figure 2, and is provided with an arm 40. The arm 40 is provided with a pair of depending rods 41, which rods are spring mounted or pivotally connected to the arm 40. The lower extremities of the rods 41 are pivoted at 42 to crank arms 43 and 44. These arms are constructed of any suitable insulating material and are constrained to move in unison. The arms 43 and 44 are provided with switching or contact means such as alloy contact points or the mercury switches 45 and 46, as illustrated.

Referring to the wiring diagram, shown schematically in Figure 6, it will be seen that the switch or contact 46 is subjected to the low voltage from the transformer 6, and the switch 45 which is in control of the motor operation, is subjected to the full line current.

In the preferred form of the invention the shaft 17 replaces the conventional scale shaft. This shaft carries a fixedly mounted and conventional weighing hand, not shown. The net weight hand indicator is mounted upon the shaft 17 as hereinabove described.

The operation of the device is as follows:

Primarily a container for merchandise, either liquid or solid, is placed upon the scale platform wither mechanically or by hand. Rotation of the shaft 17 in a clock-wise direction results. The cam 16, which is affixed to the shaft 17, forces the cam contact 15 downwardly. The shaft 12 is thereby rotated upon the shaft 12. Since the block 19 is affixed to the shaft 12, and the contact points 45 and 46 are constrained to move therewith, electrical contact is effected at both switches and dual, electrical circuits are completed. As above described, one of these circuits is comprised of the electrical connections under relatively low voltage through the electro magnet 39. The other circuit when completed includes the electric motor 3 which circuit is subjected to the line voltage.

Simultaneously with the completion of the electrical circuits the cam follower 10 is raised from the notch a and torque is supplied to the shaft 8 through the medium of the worm gear 4 and the worm wheel 5. Both electrical circuits remain completed during the time interval that the cam follower 10 remains on the periphery of the cam 9 outside of the cam notch a.

Just prior to the completion of the revolution of the cam 9 and substantially timed with the lowering of the cam follower 10 into the notch a the lug 35a, which is constrained to rotate with the shaft 8, causes the shaft 32 to move against the force of the spring 33 by reason of the contact between the lug 35a and the cam contact 34. Both the high voltage and low voltage circuits are broken when the cam follower drops into the notch a. It will be noted that a guide 32a is provided to hold shaft 32 in proper relationship with the cam 35.

During the time of energization of the circuits the net weight hand 28 is held adjacent the core of the electro magnet 39 and consequently the needle point 29 is spaced apart from the disc 31 and, therefore, no frictional contact occurs.

The shaft 32 is moved to the right against the tension of the spring 33 when the lug 35a comes in contact with the cam contact 34 and consequently the magnet 39 and net weight indicating hand 28 is returned to zero position as substantially the time that both circuits are broken. Upon deenergization of the electromagnet 39 the needle point 29 is urged outwardly against the space 31, and consequently the hand 28 is fixedly positioned at zero.

During the time of travel of the cam follower 10 within the slot a the rod 32 is released to the action of the tension spring 33 and the magnet 39 is constrained to move to the position shown in solid lines in Figure 1.

Subsequent to the above described operations and movements, the merchandise to be dispensed is placed within the container positioned upon the scale platform. The net weight hand 28 is moved clock-wise simultaneously with a similar movement of the conventional scale hand. When the desired weight has been dispensed and the container and its contents removed from the scale platform, both of the hands are moved counter clock-wise. Just prior to movement of the hands to zero position the cam 26 raises the cam contact 24 thereby forcing the contacts 45 and 46 downwardly, thus completing both of the electrical circuits above described.

Completion of the circuits subsequent to removal of the filled container causes rotation of the cam 9 in the manner as above described and the conventional hand is returned to zero position just prior to movement of the hand 28 to a like position, which movement is effected by counter clockwise movement of the magnet 39. Thus both hands are placed in zero position in readiness for the next weighing.

Manifestly, the construction as shown and described is capable of some modification and such modification as may be construed within the scope and meaning of the appended claim is also considered to be within the spirit and intent of the invention.

What is claimed is:

In a weighing apparatus, a tare compensating mechanism and net weight indicating means comprising a dual electric circuit, a magnet in one circuit, a motor in the other of said circuits, a shaft, a disc thereon having a friction face and rotated by the weight of a tare on said weighing apparatus, means actuated by rotation of said shaft to energize said circuits, a peripherally recessed cam driven by said motor, a follower on said cam periphery adapted to be raised to the high point thereon during operation of said motor, means on which said motor is mounted arranged also to be rotated by said shaft to shift the position of said magnet, a net weight pointer attracted to said magnet in its shifted position when the magnet circuit is energized, means effective to return said magnet mounting to its original position, means simultaneously actuated to drop said follower into the peripheral recess of said cam to open said circuits and means carried by said pointer and engageable with the friction face of said disc to return said pointer to zero position.

THOMAS E. DARNELL.